United States Patent Office 2,732,417
Patented Jan. 24, 1956

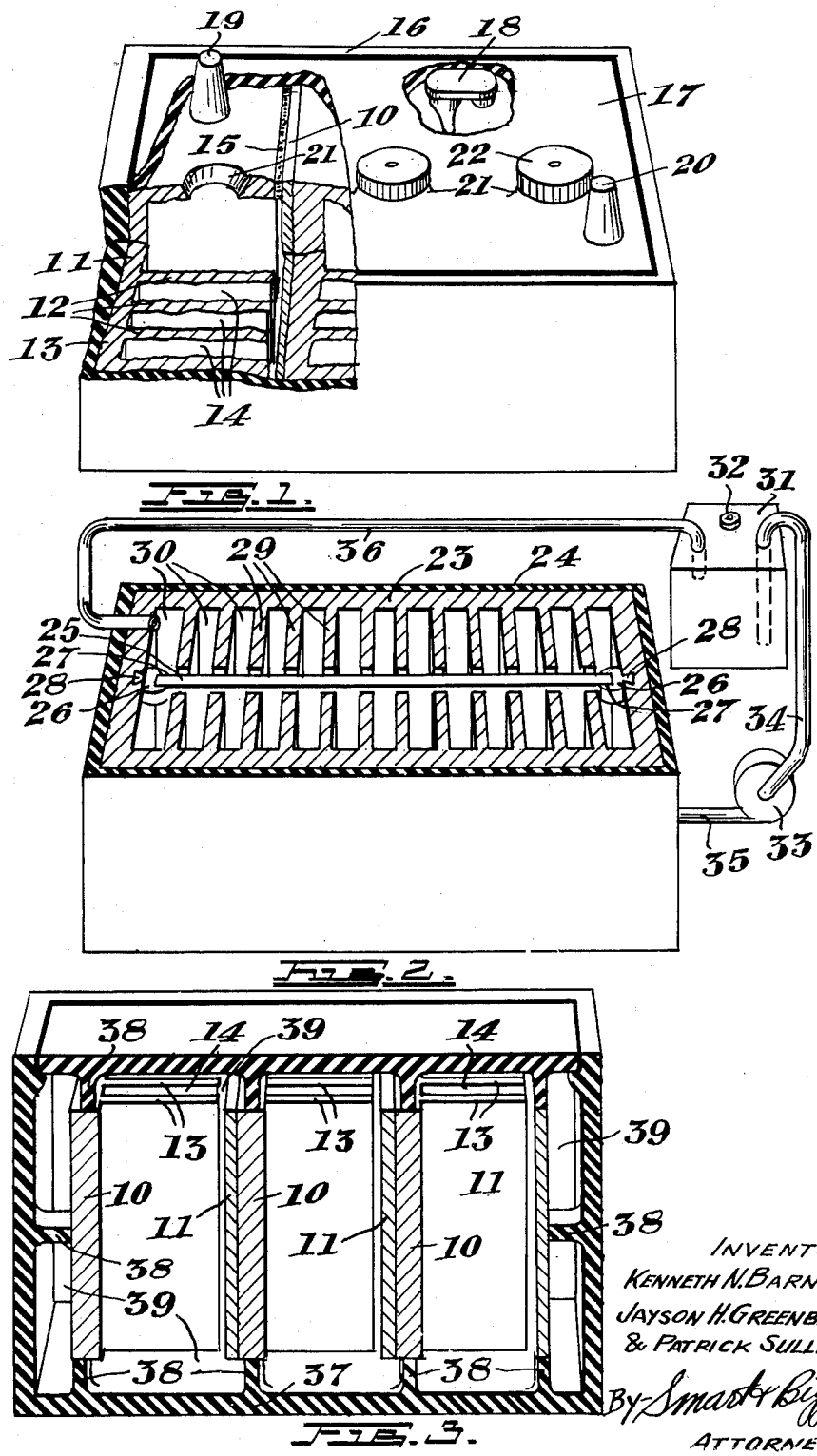

2,732,417

PRIMARY CELL USING A DEPOSITED CATHODE

Kenneth Norman Barnard, Jayson H. Greenblatt, and Patrick Sullivan, Halifax, Nova Scotia, Canada, assignors to The Minister of National Defence of Her Majesty's Canadian Government, Ottawa, Ontario, Canada Application July 10, 1952, Serial No. 298,158

Claims priority, application Canada July 11, 1951

21 Claims. (Cl. 136—100)

This invention relates to primary cells used to generate electrical energy in which the current generated is very high in relation to the space occupied by the cells.

The greater the spacing between the anode and cathode of a primary cell, the greater is the internal resistance through the electrolyte from anode to cathode which limits the maximum current output of the cell. Accordingly, where it has been a requirement of primary cells that they give the highest possible current output in relation to the space occupied, the anode and cathode have been brought as close together as possible having regard to the space required by a suitable insulator such as a fabricated inert spacer. It is known to construct a primary cell with the anodes and cathodes in contact with opposite faces of a thin fabricated inert spacer which is porous and carries the electrolyte within it.

An object of the invention is therefore to provide a primary cell of the type referred to in which the space between anode and cathode is very much reduced by reason of the nature of the insulating layer provided between anode and the effective cathode, so that the internal resistance of the cell is very much decreased and the possible maximum current output is accordingly increased. We have discovered that when an electrolyte consisting of a soluble salt of a metal low in the electrochemical series is introduced to a cell having an anode of a metal high in the electro-chemical series and a starting cathode of a metal low in the electro-chemical series spaced from but close to the anode, and a load is connected across the anode and cathode so that the electrolyte metal is deposited on the anode, there is formed between the anode and the deposited metal an insulating layer of a product of corrosion of the anode metal which is of sufficient dielectric strength to eliminate shorting of the cell but is of very low electrical resistance in comparison to the separators heretofore known. Thus the metal plated or deposited on the anode which conforms to the area of the anode in contact with the electrolyte, and is very close to the anode, may become the effective cathode on linking up with the starting cathode and there is formed a cell having a very low internal resistance and therefore producing a very high current in relation to the anode volume and area. Because the effective cathode is deposited on the anode, the anode may be so shaped as to provide a large surface area and consequently a correspondingly large effective cathode surface area, the two being at all points in such proximity by reason of dimensions of the insulating layer that the internal resistance of the cell is very low.

According to the invention an anode may be formed as a compartment adapted to receive the electrolyte and to contain the starting cathode, or the anode and the starting cathode may jointly constitute a compartment for the electrolyte and several such cells may be connected in series with the starting cathode of one cell in direct electrical contact with the anode of the next cell.

Further features of the invention will appear from the following description with reference to the accompanying drawings in which:

Figure 1 is a perspective view partly in section of a battery comprising a series of cells according to the invention in which the anode and the starting cathode jointly constitute a compartment for the electrolyte, Figure 2 is a perspective view of single cell in which the anode itself forms the compartment receiving the electrolyte and means is provided for circulating the electrolyte, Figure 3 is a perspective view of a battery comprising a series of cells of the type illustrated in Figure 1 submerged in a reservoir of electrolyte.

Referring to Figure 1, starting cathode 10, which may be in the form of thin metal foil is backed onto the outer closed side of an anode 11 being held in position for example by electrical conducting cement. Alternatively the starting cathode 10 may be backed onto anode 11 by electroplating, metal-spraying or sputtering. The anode is formed with a series of fins 12 defining between them and the end portions 13 of the anode, spaces 14 for the reception of the electrolyte. The ends of the fins 12 are spaced from but close to the starting cathode 10 of the next cell and the space between the ends 13 of the anode and the starting cathode 10 of the next cell is sealed by any suitable insulating sealing material 15 such for example as Bakelite, electroplating tape or similar materials. It will be apparent that any number of cells as illustrated in Figure 1 may be connected to form a battery, three cells being shown by way of example in Figure 1 housed within a casing 16, which may be of hard rubber, having a top 17. The starting cathode 10 of each cell is electrically connected to the anode 11 of the adjacent cell in the battery by the backing of the starting cathode on to the anode as noted above, and if desired a strap or the like 18 may be provided as a second connection. Terminal posts 19 and 20 are provided projecting through the top 17 and connected respectively to the anode of the cell at one end of the battery and the cathode of the cell at the other end of the battery.

The anode 11 is formed of a metal high in the electrochemical series such as magnesium, aluminium, manganese, zinc, nickel, iron or their alloys and is preferably magnesium. The starting cathode may be any metal which is low in the electro-chemical series (by which is meant low in relation to the selected anode metal) such as iron, silver, copper, lead, tin or mercury and is preferably copper or silver. The electrolyte may be a soluble salt of a metal low in the electro-chemical series such as a soluble copper salt and the solution may be in sea water for example or may be in a dilute aqueous acid in which case the action of the cell is accelerated as hereinafter described. In the following description of the operation of a cell of the type illustrated in Figure 1 it will be assumed that the anode is magnesium, the cathode is copper, and the electrolyte is a soluble salt of copper in a dilute aqueous sulphuric acid as good results have been obtained with a cell of this composition although even better results have been obtained for example with a cell having an anode of magnesium, a starting cathode of copper or silver and an electrolyte of a soluble silver salt.

Considering the case of a single cell—when a load is connected across the anode 11 and the starting cathode 10 (that is when the external circuit is closed), the copper deposits out both on the copper cathode 10 and on the magnesium anode 11. The deposit of copper on the magnesium is due to local action and the deposits of copper on the magnesium (which are initially isolated) cause local short circuiting of the cell. The current output at this point is low because of the local short circuiting, because of the space between the initial cathode 10 and the anode 11, and because the surface area of the initial cathode 10 is small. However, as the magnesium goes into solution forming magnesium ions, some of these ions are deposited as insoluble compounds on the anode forming an insulating layer between the magnesium and deposits of copper which stops the local short circuiting. Chemical analysis of this corrosion product, confirmed by X-ray diffraction patterns shows that when using a copper sulphate-sulphuric acid electrolyte the corrosion product is a mixture of magnesium hydroxide and magnesium sulphate in the ratio of approximately 7 to 1. With a chloride electrolyte the corrosion product forming the insulating layer would contain magnesium chloride.

This corrosion product builds up as an insoluble porous layer of adequate dielectric strength but does not continue to grow rapidly and remains very thin so as to give almost molecular separation between the anode and the deposited copper. However, the deposited copper continues to grow as it is linked up with the starting cathode of copper, and the cell delivers its maximum current until all of the copper salt or all of the magnesium of the anode is consumed. The result is a cell which provides a very high current in relation to anode volume and surface area although the duration of the current is limited by the volume of the anode metal or the amount of electrolyte available. Currents of over 100 amperes through an external resistance load of approximately 0.01 ohms giving a voltage drop of 1 volt across the resistance, have been obtained from a cell of the composition described having a cubical anode volume of 2 cubic inches and effective anode area of 25 square inches. For certain applications the time lag between the closing of the external circuit and the production of maximum current must be very small and therefore in order to increase the rate of dissolution of magnesium with the resulting formation of the insulating layer and the deposited layer of copper, the electrolyte should be acidified. It has further been found possible, in order to decrease the time lag, to pre-treat the anode in a suitable electrolyte bath so as to preform the thin insulating layer of corrosion product. A suitable electrolyte for pre-treatment may consist of any of the electrolytes used in the cell minus the metallic salt.

The electrolyte metal deposited on the anode is porous and it will eventually fill up the spaces 14 provided that there remains undissolved anode metal. Accordingly the quantity of the electrolyte provided for introduction to the spaces 14 depends on the concentration of the electrolyte, the cubical volume of the anode and the extent of the spaces 14. This assumes, of course, the desire to continue the operation of the cell as long as possible for the given cell size.

Normally it is necessary to provide for introducing to the spaces 14 more electrolyte than the spaces 14 can contain at any one time. In that event the electrolyte may be circulated through the cells from a reservoir as described with reference to Figure 2 and the concentration may be adjusted in the reservoir. Alternatively a cell or group of cells may be submerged in a reservoir of electrolyte as described with reference to Figure 3. For special applications the electrolyte may be introduced to each cell through filler holes 21 (Figure 1) closed by vented caps 22, the electrolyte which is to be introduced through the holes 21 to put the cell or battery in operation being prepared in the strength required for operating the cell or prepared as a concentrated solution and diluted just before entering the cell.

Referring now to Figure 2, there is illustrated a single cell in which the anode 23, housed in a casing 24, defines an electrolyte compartment. The starting cathode 25 is positioned in the centre of the compartment by members 26 each formed with a groove 27 to engage an end of the starting cathode, and a projection 28 engaging in a vertical slot formed in the anode. The correct positioning of the starting cathode may also be ensured by the provision of a recess (not shown) formed in the top and bottom of the casing 24 into which the starting cathode fits. Fins 29 project inwardly from the side walls of the compartment toward the starting cathode defining between them spaces 30 for the electrolyte. In view of the large anode area in relation to the extent of the spaces 30, the electrolyte is circulated through the cell from a reservoir 31 vented at 32, the electrolyte being pumped from the reservoir by pump 33 through pipe 34 and introduced to the cell through pipe 35. In order that the electrolyte entering the cell through pipe 35 may pass to each of the spaces 30, grooves (not shown) may be formed in the inside face of the bottom of the casing on which the anode rests and in the inner face of the top of the casing, or both top and bottom of the casing may be spaced from the anode which may be raised from the bottom of the casing by ribs or the like. The electrolyte then leaves the cell through pipe 36 and returns to the reservoir 31. The reservoir 31, pipes 34, 35 and 36 and pump 33 are all provided with non-conducting, e. g., hard rubber surfaces where they contact the electrolyte. As noted above the reservoir 31 is vented at 32. Additionally the cell itself may be vented although normally the gases formed may be carried to the reservoir through pipe 36 and may then escape through vent 32. The usual terminal connections as indicated in Figure 1 are not shown in Figure 2.

The internal resistance of the cell of the type illustrated in Figure 2 is not as low as the internal resistance of the cell of the type illustrated in Figure 1 unless a thicker starting cathode is used.

In Figure 3 there is illustrated a battery consisting of a series of cells of the type illustrated in Figure 1 and accordingly the same reference numerals are used for parts corresponding to those appearing in Figure 1. In Figure 3 the cells are set in a casing 37 adapted to hold the series of cells spaced from the walls of the casing by ribs 38 so as to define a sufficient electrolyte space to make it unnecessary in most applications to introduce fresh electrolyte from a separate reservoir. In effect, the arrangement of Figure 3 constitutes the immersion of the series of cells in a reservoir of electrolyte, the spaces 39 between the series of cells and the walls of the casing 37 being additional to the spaces 14. The ribs 38 are not continuous and therefore the electrolyte in any part of the spaces 39 may have access to any one of the cells of the bank. If desired the electrolyte may be circulated through a battery of the type illustrated in Figure 3. However, the connections for such circulation, the electrical connections between the cells and the terminals of the battery are omitted for convenience in illustration.

What we claim as our invention is:

1. A primary cell comprising an anode of a metal high in the electro-chemical series, a cathode of a metal low in the electro-chemical series, a second cathode electrolytically deposited over the anode surface and linked to the first cathode, and an insulating layer between the anode and the deposited cathode comprising a naturally formed corrosion product of the anode formed during the electrolysis.

2. A primary cell as claimed in claim 1 in which the anode metal is magnesium, the metal of the first and second cathodes is copper and the metal of the electrolyte is copper.

3. A primary cell as claimed in claim 1 in which the anode metal is magnesium, the first cathode metal is copper, the second cathode metal is silver, and the metal of the electrolyte is silver.

4. A primary cell as claimed in claim 1 in which the anode metal is magnesium, the first cathode metal is silver, the second cathode metal is silver, and the metal of the electrolyte is silver.

5. A primary cell as claimed in claim 1 in which the electrolyte comprises a mild aqueous acid.

6. A primary cell as claimed in claim 1 in which the electrolyte comprises a solution of the metal salt in sea water.

7. A primary cell for supplying electrical energy comprising an anode of a metal high in the electro-chemical series in the form of a compartment, a starting cathode of a metal low in the electro-chemical series spaced from but close to at least part of the anode compartment, and an electrolyte comprising a soluble salt of a metal low in the electro-chemical series adapted to form a deposited cathode of an electrolytically deposited layer of the electrolyte metal over the surface of the anode and to link up with the starting cathode.

8. A primary cell for supplying electrical energy comprising an anode defining a compartment adapted to contain an electrolyte, a starting cathode, the anode being formed of a metal high in the electro-chemical series, the starting cathode being formed of a metal low in the electro-chemical series, and the electrolyte comprising a soluble salt of a metal low in the electro-chemical series and adapted to form on the surface of the anode contacted by the electrolyte, an insulating layer of products of corrosion of the anode metal and a layer of the electrolyte metal forming a deposited cathode, the starting cathode being spaced from but close to the anode and linked to the deposited cathode.

9. A primary cell as claimed in claim 8 in which the anode compartment comprises a series of fins each spaced from but close to the starting cathode, a series of passages between the fins adapted to permit the passage of electrolyte, and an inlet and an outlet for the electrolyte.

10. A primary cell as claimed in claim 8 in which the anode metal is magnesium and the metal of the starting cathode and deposited cathode is copper.

11. A primary cell as claimed in claim 8 in which the anode metal is magnesium, the starting cathode metal is copper and the deposited cathode metal is silver.

12. A primary cell for suppying electrical energy comprising an anode and a starting cathode together defining a compartment adapted to contain an electrolyte, the anode being formed of a metal high in the electro-chemical series, the starting cathode being formed of a metal low in the electro-chemical series, and the electrolyte comprising a soluble salt of a metal low in the electro-chemical series and adapted to form on the surface of the anode contacted by the electrolyte, an insulating layer of products of corrosion of the anode metal and a layer of the electrolyte metal forming a deposited cathode, the starting cathode being spaced from but close to the anode and linked to the deposited cathode.

13. A primary cell as claimed in claim 12 comprising inlet and outlet means for electrolyte.

14. A primary cell as claimed in claim 13 comprising means for circulating the electrolyte through the cell.

15. A battery of primary cells for supplying electrical energy comprising a plurality of anodes each defining at least three sides of a compartment adapted to contain an electrolyte, a starting cathode in direct electrical contact with the outer face of a side of the compartment and with the open side of each anode being positioned against the starting cathode in contact with the side of another cell and separated from such starting cathode by insulating sealing means, the anode being formed of a metal high in the electro-chemical series, the starting cathode being formed of a metal low in the electro-chemical series, and the electrolyte comprising a soluble salt of a metal low in the electro-chemical series and adapted to form on the surface of the anode contacted by the electrolyte, an insulating layer of products of corrosion of the anode metal and a layer of the electrolyte metal forming a deposited cathode, the starting cathode being spaced from but close to the anode and linked to the deposited cathode.

16. A primary call for supplying electrical energy comprising an anode of a metal high in the electro-chemical series, a starting cathode of a metal low in the electro-chemical series spaced from but close to at least part of the anode, and an electrolyte comprising a soluble salt of a metal low in the electro-chemical series adapted to form a deposited cathode of an electrolytically deposited layer of the electrolyte metal over the surface of the anode and to link up with the starting cathode.

17. A primary cell as claimed in claim 16 in which the anode metal is magnesium, the starting cathode metal is copper, and the metal of the electrolyte is copper.

18. A primary cell as claimed in claim 16 in which the anode metal is magnesium, the starting cathode metal is copper and the metal of the electrolyte is silver.

19. A primary cell as claimed in claim 16 in which the anode metal is magnesium, the starting cathode metal is silver and the metal of the electrolyte is silver.

20. A primary cell as claimed in claim 16 in which the electrolyte comprises a metal aqueous acid.

21. A primary cell as claimed in claim 16 in which the electrolyte comprises a solution of the metal salt in sea water.

References Cited in the file of this patent

UNITED STATES PATENTS

| Number | Name | Date |
|---|---|---|
| 2,428,850 | Lawson | Oct. 14, 1947 |
| 2,441,896 | Moir | May 18, 1948 |
| 2,445,306 | Lawson | July 13, 1948 |